United States Patent
Holter et al.

(10) Patent No.: US 6,542,673 B1
(45) Date of Patent: Apr. 1, 2003

(54) IDENTIFIER SYSTEM AND COMPONENTS FOR OPTICAL ASSEMBLIES

(75) Inventors: Dwight J. Holter, Naples, FL (US); Michael L. Wach, Atlanta, GA (US)

(73) Assignee: Cirrex Corp., Alpharetta, GA (US)

( * ) Notice: Subject to any disclaimer, the term of this patent is extended or adjusted under 35 U.S.C. 154(b) by 0 days.

(21) Appl. No.: 09/888,064

(22) Filed: Jun. 22, 2001

Related U.S. Application Data

(63) Continuation-in-part of application No. 09/318,451, filed on May 25, 1999, which is a continuation of application No. 08/819,979, filed on Mar. 13, 1997, now Pat. No. 5,953,477.
(60) Provisional application No. 60/213,983, filed on Jun. 24, 2000.

(51) Int. Cl.[7] .............................. G02B 6/42; G02B 6/24
(52) U.S. Cl. ........................ 385/52; 385/31; 385/100; 385/123; 385/128
(58) Field of Search .................. 356/73.1, 401; 385/52, 97, 91, 100, 123, 128, 31, 37; 438/25–27, 65, 64; 65/31

(56) References Cited

U.S. PATENT DOCUMENTS

| | | | |
|---|---|---|---|
| 4,725,110 A | 2/1988 | Glenn et al. | 350/3.61 |
| 4,807,950 A | 2/1989 | Glenn et al. | 350/3.61 |
| 5,235,659 A | 8/1993 | Atkins et al. | 385/124 |
| 5,237,630 A | 8/1993 | Hogg et al. | 385/12 |
| 5,259,059 A | * 11/1993 | Abramov | 385/123 |
| 5,264,722 A | * 11/1993 | Tonucci et al. | 250/207 |
| 6,069,991 A | * 5/2000 | Hibbs-Brenner et al. | 385/50 |

* cited by examiner

*Primary Examiner*—Robert H. Kim
*Assistant Examiner*—Krystyna Suchecki
(74) *Attorney, Agent, or Firm*—King & Spalding

(57) ABSTRACT

A device and system for eliminating repeated testing of optical components while manufacturing an optical assembly can include a high-performance optical component having a machine-readable identifier disposed within the peripheral area of its end face. The machine-readable identifier can be etched into the end face and can provide information about the component, such as any one of the following optical characteristics: orientation, manufacturing information, and dimensions and compositions of the materials of the optical component. The optical component can also have a plurality of machine-readable identifiers disposed within the peripheral area of its end face, where each can provide different information. Optical components can then be automatically and precisely aligned before being mated to form an optical assembly. A determination of the optical characteristics, information, and alignment of the components can be possible even after the components are mated together.

34 Claims, 8 Drawing Sheets

IDENTIFIER SYSTEM AND COMPONENTS FOR OPTICAL ASSEMBLIES

CROSS-REFERENCE TO RELATED APPLICATIONS

This application claims the benefit of priority to U.S. Provisional Application No. 60/213,983, entitled "Micro Identifier System and Components for Optical Assemblies," filed Jun. 24, 2000. This application is also a continuation-in-part of U.S. application Ser. No. 09/318,451, filed May 25, 1999, now U.S. Pat. No. 6,404,953, issued Jun. 11, 2002, which is a continuation application of U.S. application Ser. No. 08/819,979, filed Mar. 13, 1997, now U.S. Pat. No. 5,953,477, issued Sep. 14, 1999, the disclosure of which is hereby fully incorporated by reference.

BACKGROUND OF THE INVENTION

1. Field of the Invention

The present invention relates to the automated production of quality optical assemblies. More particularly, the present invention relates to high-performance waveguides having a machine-readable identifier and automated production systems using the same.

2. Description of the Related Art

In recent years, optical assemblies have been recognized as offering a high potential for solving problems in a number of commercial applications. Such optical assemblies include optical waveguides, planar light guide circuits (PLCs), waveguides for distributed feedback lasers, and other like assemblies. High quality optical assemblies are particularly useful in, for example, telecommunications, medical diagnostics, pharmaceutical research, and chemical process monitoring. Additionally, ultra high-performance optical waveguides, such as waveguides associated with high-performance filters and precision micro optics, have the potential to fill a critical role in the continuing demand for increased bandwidth in telecommunications and in providing major improvements in medical diagnostics and pharmaceutical applications.

Numerous difficulties exist in the manufacturing of quality optical assemblies, because many of the individual components of optical assemblies are typically small and technically complex. For example, the relatively small size of each component makes differences between the components, or even differences within individual components, difficult to discern. For instance, such differences may include optical differences across the end face of an optical fiber. For quality optical assemblies, the discontinuities between the individual components need to be minimized.

For example, to achieve maximum effectiveness, the optical characteristics of an optical waveguide's end face usually must be considered when connecting it to an optical component such as another optical waveguide. The end face of the waveguide may be intentionally angled. Because the end face is angled, it is not uniformly perpendicular to its axis or the axis of the optical component to which it is to be coupled. (As used throughout the specification, the terms couple, coupling, coupled, etc. are defined as any joining of two optical components that results in any optical connection between the two components, a face-to-face nonpermanent connection between the components, or a face-to-face permanent connection between the components.) The angle may be very slight, but it may be critical to have the end face precisely aligned with the other optical component. To identify the optical characteristics and alignment of the waveguide's end face, optical testing is conventionally used. In optical testing, test equipment measures the characteristics of light propagating through the waveguide. The measurements are used to determine the optical differences across the end face of the waveguide and the alignment of the waveguide with respect to the optical component. The waveguide is then rotated to achieve the proper alignment with the optical component.

Conventional optical testing is time consuming when performed in a manufacturing environment. For example, the manufacturing process must be interrupted to perform the testing to identify the waveguide's alignment. The waveguide is then rotated for alignment with the optical component. Then, the manufacturing process may be interrupted again to perform another optical test to check the new alignment. If needed, the waveguide may be rotated again, and further testing interruptions may be required. Additionally, after the two components are coupled together, another testing interruption is necessary for quality control of the assembled components. Accordingly, the manufacturing process is delayed each time the optical testing is performed to identify the characteristics of the components. Furthermore, optical testing performed in a manufacturing environment is not as accurate as optical testing performed in a testing environment. The inaccuracy of that testing can cause improper alignment between the components, which provides a lower quality assembly.

Accordingly, there is a need in the art for an improved system for automated production of quality optical assemblies. There is also a need in the art for a device, system, and method that easily and quickly identify optical characteristics and other information of optical assembly components, without using time-consuming testing during the manufacturing process.

SUMMARY OF THE INVENTION

The present invention can solve the problems of conventional systems and methods by eliminating the need for repeated testing of optical components while assembling optical components. The present invention can provide a quick determination of the optical characteristics and other information of the optical components. Accordingly, the optical components can then be automatically and precisely aligned before being mated to form an optical assembly. Furthermore, the present invention can also allow a quick determination of the optical characteristics, information, and alignment of the components even after the components are mated together.

According to one exemplary embodiment of the present invention, a fiber optic segment can comprise an end face having a peripheral end area, a peripheral edge area, and a machine readable identifier that is readable from at least one of the peripheral areas. The peripheral end area comprises an outer portion of the end face. The peripheral edge area comprises the exterior, cylindrical edge (side wall) of the fiber cladding. The machine-readable identifier can be on the end face peripheral end area, in the fiber segment but readable from the end face, on the peripheral edge area, or in the fiber segment but readable from the peripheral edge area. In one exemplary embodiment, the machine-readable identifier could be, a bar code on the end surface, which can be readable from both the end face peripheral area or the peripheral edge area. In another exemplary embodiment, the machine-readable identifier could be a series of Bragg gratings, which can be readable from both the end face peripheral area or the peripheral edge area.

According to another exemplary embodiment of the present invention, an optical waveguide identification system can comprise an optical waveguide and a machine-readable identifier disposed within the peripheral area of the waveguide's end face. The machine-readable identifier can be etched into the end face and can provide information about the waveguide. Such information can comprise optical characteristics, orientation, manufacturing information, and dimensions and compositions of the materials of the waveguide. The waveguide can also have a plurality of machine-readable identifiers disposed within the peripheral area of its end face, where each can provide different information.

In another exemplary embodiment of the present invention, an optical waveguide identification system can comprise an optical waveguide, a machine-readable identifier disposed within the peripheral area of the waveguide's end face, and a machine-readable identifier disposed within the waveguide's exterior (side) cladding. The information of the exterior identifier is accessible even after the waveguide has been joined to another optical component. The two identifiers can have the same or different information. The waveguide can also have a plurality of identifiers on its end face and cladding, with information provided in identifiers disposed within the end face being provided in a corresponding identifier disposed within the exterior cladding.

In yet another exemplary embodiment of the present invention, a system for assembling optical components can comprise a reading device that reads information comprised in the above-described identifiers of an optical waveguide. A controller then adjusts the orientation of the waveguide for proper alignment with a corresponding optical component, based on the information read from the identifier. The waveguide and the optical component can then be joined in a precise alignment to provide a quality optical assembly.

In another exemplary embodiment of the present invention, an optical waveguide identification system can comprise an optical waveguide having a mask on its end face and a machine-readable identifier disposed on the peripheral area of an end face of the mask. The mask can be opaque to at least some wavelengths of light, which can eliminate unwanted optical noise. Additionally, an identifier can be disposed within an exterior surface of the mask. A filter can also be provided on the end face of the waveguide. The filter can block or redirect certain wavelengths of light propagating within the waveguide to eliminate or redirect light of certain wavelengths or to pass only light of certain wavelengths. The optical assembly can then be used as an optical component in the manufacturing system described above.

According to another embodiment of the present invention, a method for assembling optical components can comprise providing a machine-readable identifier on an optical waveguide. Information contained in the identifier can be read by a reading device, and then the waveguide can be aligned for precise connection to an optical component, based on the read information. If desired, the information contained in the identifier can be read again, and the alignment of the waveguide can be fine tuned based on that read information. The waveguide and the optical component can then be precisely coupled together. After coupling the components together, the information in the identifier on the waveguide can be read again and used for quality control to verify proper alignment of the waveguide and the optical component.

These and other aspects, objects, and features of the present invention will become apparent from the following detailed description of the preferred embodiments, read in conjunction with, and reference to, the accompanying drawings.

DETAILED DESCRIPTION OF THE EXEMPLARY EMBODIMENTS

Figure 1A:
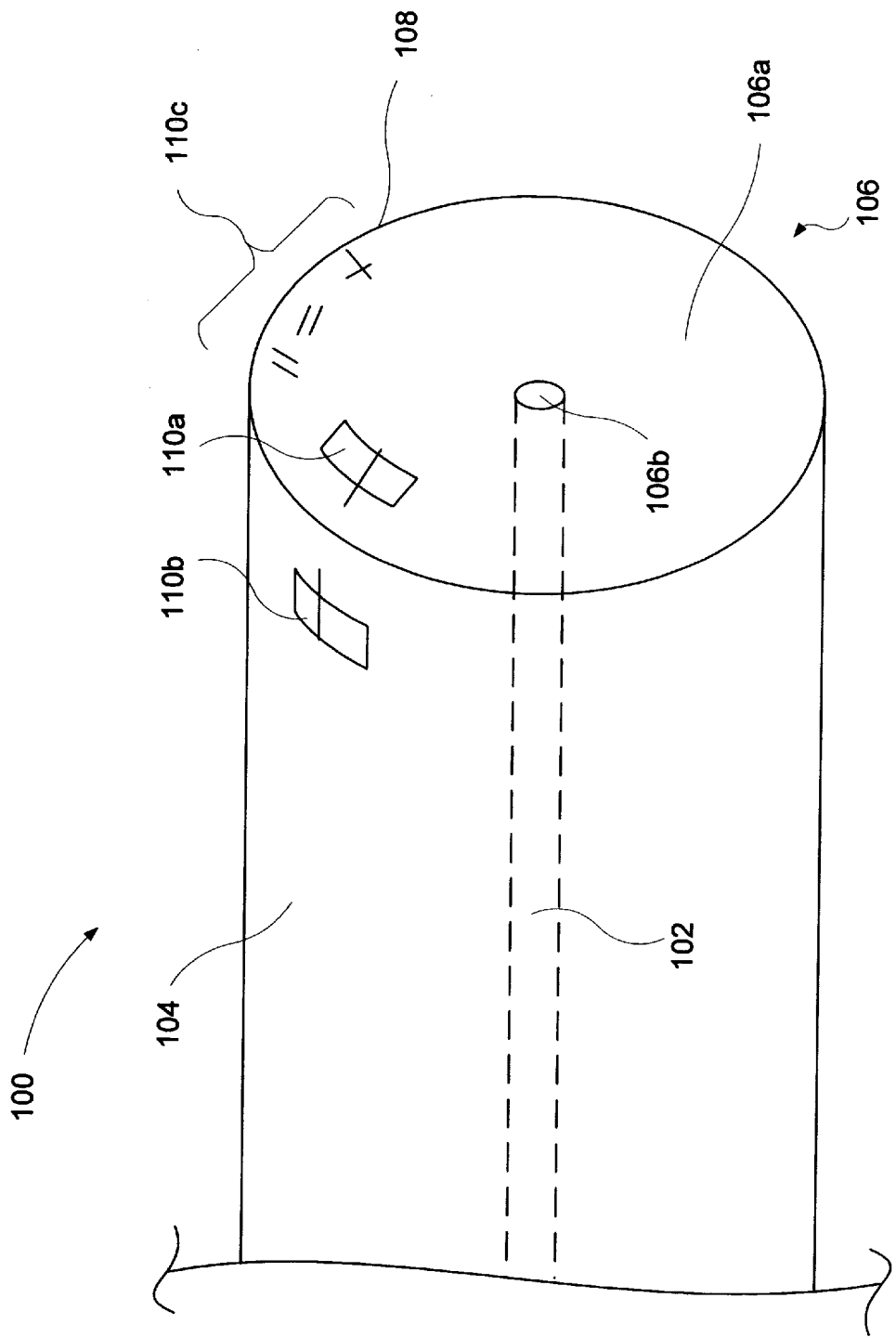
FIG. 1A illustrates a perspective view of an optical waveguide identification system according to an exemplary embodiment of the present invention.

The present invention will be described in detail with reference to the accompanying drawings, in which like reference numerals represent like elements.

As used herein, the term "waveguide" refers to an optical structure having the ability to propagate light in a bounded propagation mode along a path parallel to its axis and to contain the energy within or adjacent to its surface. Typically, such waveguides can propagate light in the 700–2000 nanometer (nm) range.

The present invention facilitates the automation of manufacturing quality optical assemblies having waveguides as a component. In the present invention, an identifying mechanism is provided on or in a high-performance waveguide. The identifying mechanism is machine-readable. For example, the identifying mechanism may be read by an optical method such as using a laser interference pattern. Machine reading allows a quick and accurate determination of the information included within the identifying mechanism, thereby allowing precise orientation of the waveguide with respect to an adjoining component.

Referring to FIG. 1, an exemplary embodiment of an optical waveguide identification system 100 according to the present invention will be described. System 100 comprises an optical waveguide with a core 102 and cladding 104 disposed around core 102. An end face 106 of system 100 comprises a cladding region end face 106a and a core region end face 106b. The entire end face 106 may include an integral filter (not shown). A first identifier 110a is disposed within a peripheral end area of cladding end face 106*a*. The peripheral end area of cladding end face 106*a* comprises the area near an edge 108 of cladding end face 106*a*. Edge 108 comprises the junction of cladding end face 106*a* and an exterior (side) wall of cladding 104. An optional or alternative identifier 110*c*, which is shown as registration marks, can be disposed within the peripheral end area of cladding end face 106*a*. A side identifier 110*b* can be disposed within a peripheral edge area of the exterior wall of cladding 104. The peripheral edge area of cladding 104 comprises an internal area of cladding 104 near the exterior wall and including the exterior wall (i.e., the internal area of cladding 104 corresponding to the peripheral end area of cladding end face 106*a* and including the exterior wall). Side identifier 110*b* may comprise the same information as identifier 110*a*, or it may comprise different information.

System 100, and other systems discussed below, may comprise any known waveguide, for example, an optical fiber, a planar light guide circuit, a waveguide for a distributed feedback laser, and other like assemblies. Core 102 may be composed of, for example, silica, plastic, or glass. Cladding 104 is a material that has a lower refractive index than core 102. Accordingly, cladding 104 may be composed of a different material than core 102. Alternatively, cladding 104 may be composed of a similar material as core 102 that is doped to reduce its refractive index.

Identifiers 110*a* and 110*c* can be disposed on end face 106 in the peripheral end area of cladding end face 106a, or they can be disposed in cladding 104 (behind the peripheral end area of cladding end face 106*a*). In either case, identifiers 110*a* and 110*c* can be read from the peripheral end area of cladding end face 106*a*, from the peripheral edge area of cladding 104 (i.e., from the side), or both. Additionally, side identifier 110*b* can be disposed on the exterior wall of cladding 104 or in the peripheral edge area of cladding 104 (i.e., behind the exterior wall of cladding 104). In either case, identifier 110*b* can be read from the peripheral end area of cladding end face 106*a*, from the peripheral edge area of cladding 104 (i.e., from the side), or both.

Figure 1C:
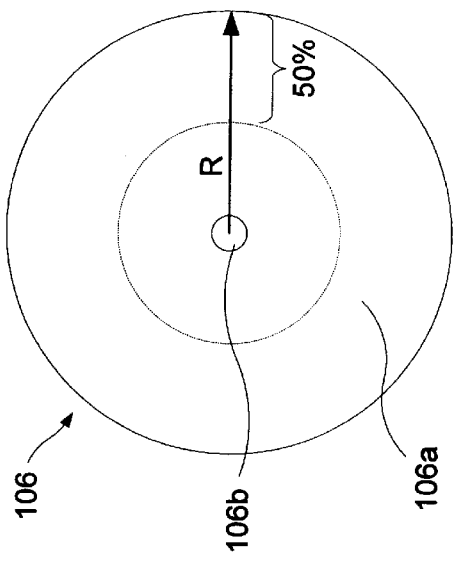
FIGS. 1B–1E illustrate exemplary embodiments of cladding end face peripheral areas according to the present invention.
Figure 1E:
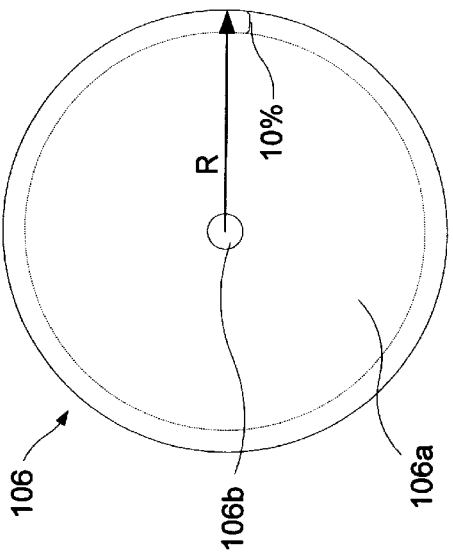
Figure 1B:
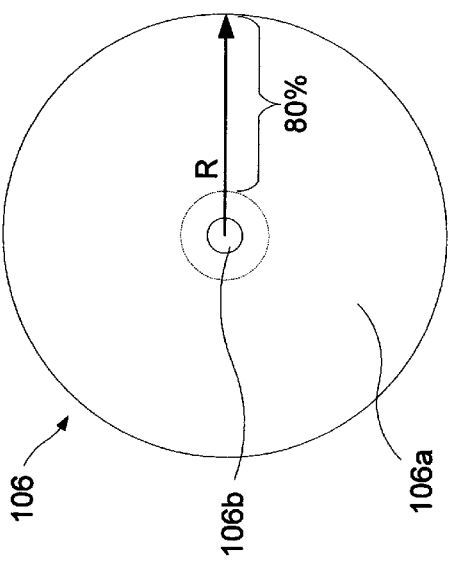
Figure 1D:
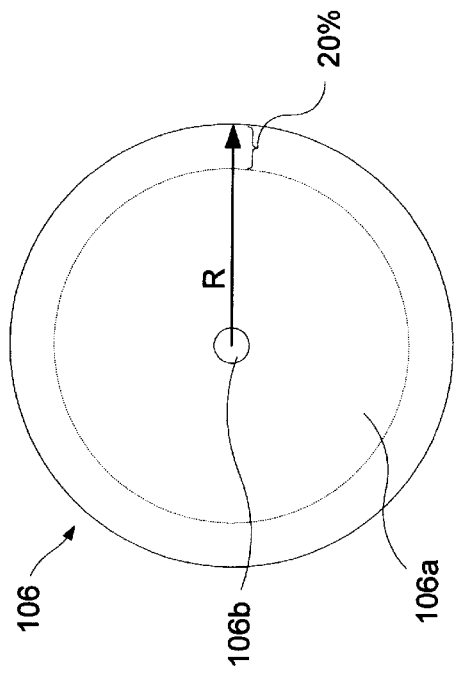

First identifier 110*a* can comprise a registration mark, or it can comprise more detailed information about system 100. If first identifier 110*a* or optional identifier 110*c* comprise registration marks, that information may be used to assure, for example, proper alignment of system 100 in an assembly operation. In one exemplary embodiment, identifiers 110*a* and 110*c* are disposed in cladding 106*a* such that they are not in the substantive evanescent field of propagating light, i.e. so that they are outside the mode field diameter. FIGS. 1B–1E illustrate further exemplary embodiments of the location of identifiers 110*a* and 110*c*. Identifiers 110*a* and 110*c* can be disposed within the peripheral area of cladding end face 106*a* of end face 106. In one exemplary embodiment, the peripheral area is defined as a region comprising the exterior 80% of cladding end face 106*a* (FIG. 1B), where 80% refers to 80% of the radius R of cladding end face 106*a*. In another exemplary embodiment, the peripheral area is defined as a region comprising the exterior 50% of cladding end face 106*a* (FIG. 1C). In yet another exemplary embodiment, the peripheral area is defined as a region comprising the exterior 20% of cladding end face 106*a* (FIG. 1D). In still another exemplary embodiment, the peripheral area is defined as a region comprising the exterior 10% of cladding end face 106*a* (FIG. 1E). Location of the identifiers within the peripheral area of cladding end face 106*a* avoids interfering with the photon transmission purposes of system 100. Identifier 110*b* can be disposed within the peripheral edge area of cladding 104, where the peripheral edge area corresponds to one of the peripheral areas defined above.

The present invention is not limited to the quantity and locations of the identifiers shown in FIG. 1. For example, only one identifier may be used if the desired information can be provided in that manner. Furthermore, additional identifiers or combinations of identifiers may be used to provide the desired information.

An identifier according to the present invention could be designed to serve a functional role in the operation or use of the waveguide. However, its main function is to allow a quick determination of the information comprised within the identifier. Time-consuming optical testing during the manufacturing process is not needed to determine the optical characteristics of the waveguide. Accordingly, a detailed re-analysis of at least one specific waveguide technical characteristic included in the identifier can be avoided.

The identifier of the present invention may be a registration mark that indicates the orientation needed in the assembly. For other applications, it may be desirable to incorporate different or additional information in the identifier. Preferably, the identifiers of the present invention discussed throughout this specification are reserved for micro bar code, magnetic, or other identification information that assists appropriate alignment and mating of the optical components of optical assemblies. For example, the waveguide's core and polarization axes can be identified with respect to the location of the identifier. Additionally, the core dimension and location can be identified. Proper information in the identifier(s) can minimize the testing burden described above. Using code in the identifier(s) to reference specific, detailed computer link information can allow for unlimited information about the optical component.

Figure 2:
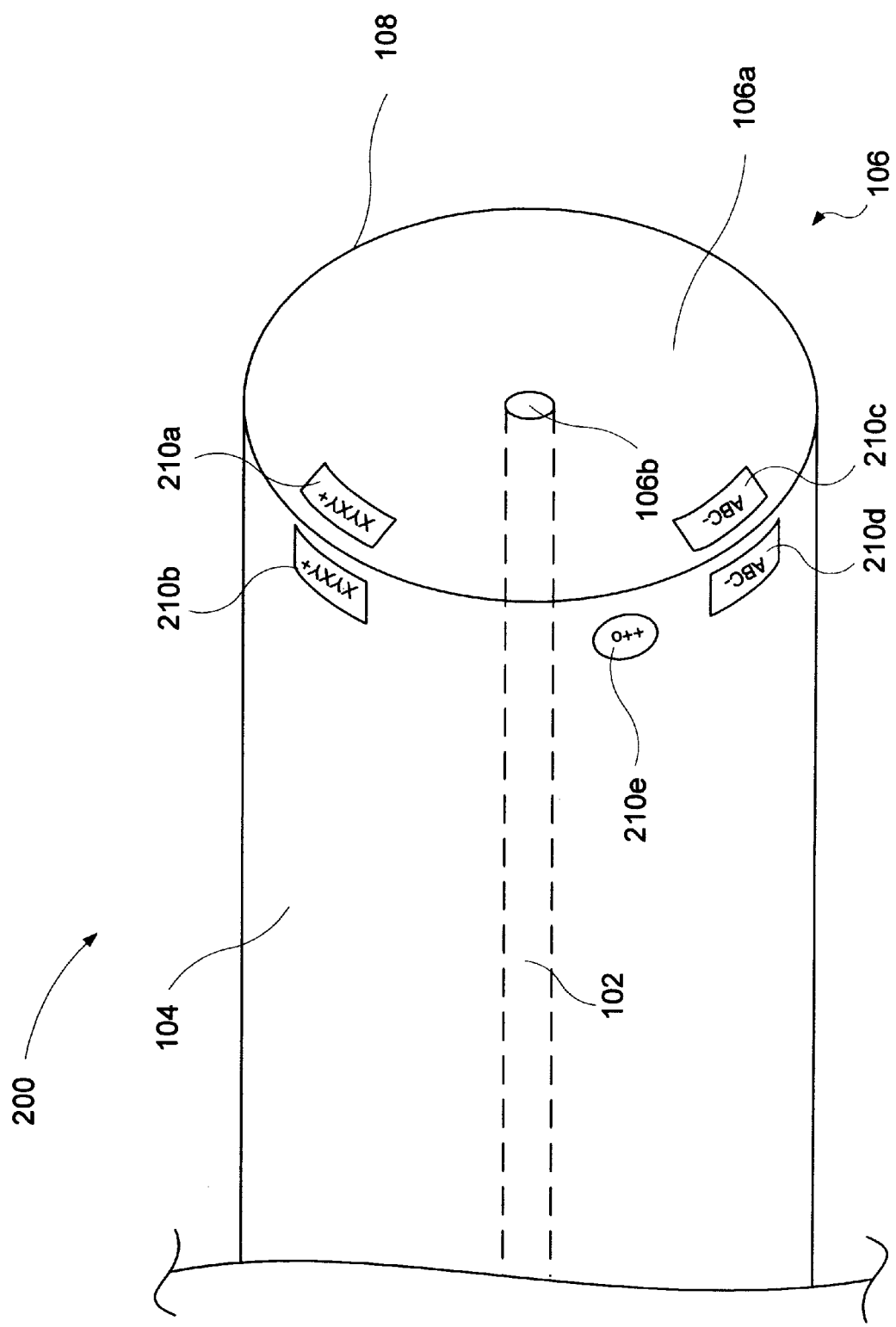
FIG. 2 illustrates alternative, exemplary identifier configurations for an optical waveguide identification system according to the present invention.

Referring to FIG. 2, several options for placing or configuring the identifiers on system 100 according to exemplary embodiments of the present invention will be described. As shown, identifiers 210*a*–210*e* may be located in alternative locations on cladding end face 106*a* and the exterior wall or side of cladding 104. First and second identifiers 210*a* and 210*c* can be disposed within the peripheral area of cladding end face 106*a*. In this exemplary embodiment, different information is included in first and second identifiers 210*a* and 210*c*. For example, the information in first identifier 210*a* could be coded information relating to the technology in the fiber, while the coded information in second identifier 210*c* could identify the manufacturer, plant location, manufacturing line, specific run, etc. Information identical to that included in first and second identifiers 210*a* and 210*c* can be included in third and fourth identifiers 210*b* and 210*d*, respectively, which are disposed within the peripheral edge area of the exterior (side) wall of cladding 104. Providing an identifier within the peripheral edge of the exterior cladding wall allows continuing identification after system 100 is joined at its end face 106 to another optical assembly component. Additionally, identifiers 210*a* and 210*c* can also perform that function if readable from the peripheral edge area. Fifth identifier 210*e* is included to illustrate that a plurality of identifiers may be utilized when appropriate.

Figure 3:
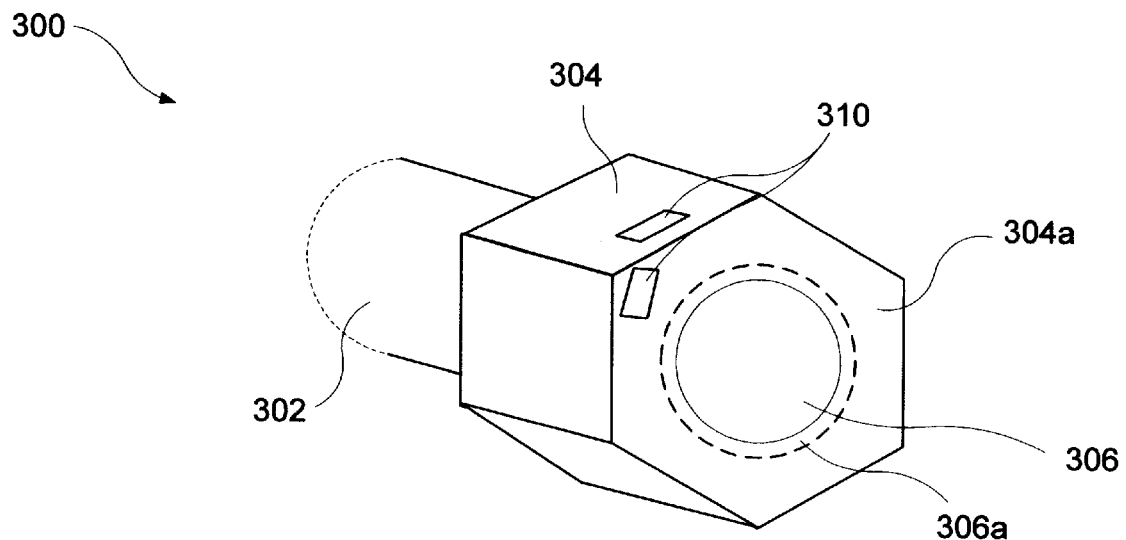
FIG. 3 illustrates a perspective view of an optical waveguide identification system according to another exemplary embodiment of the present invention.
Figure 4:
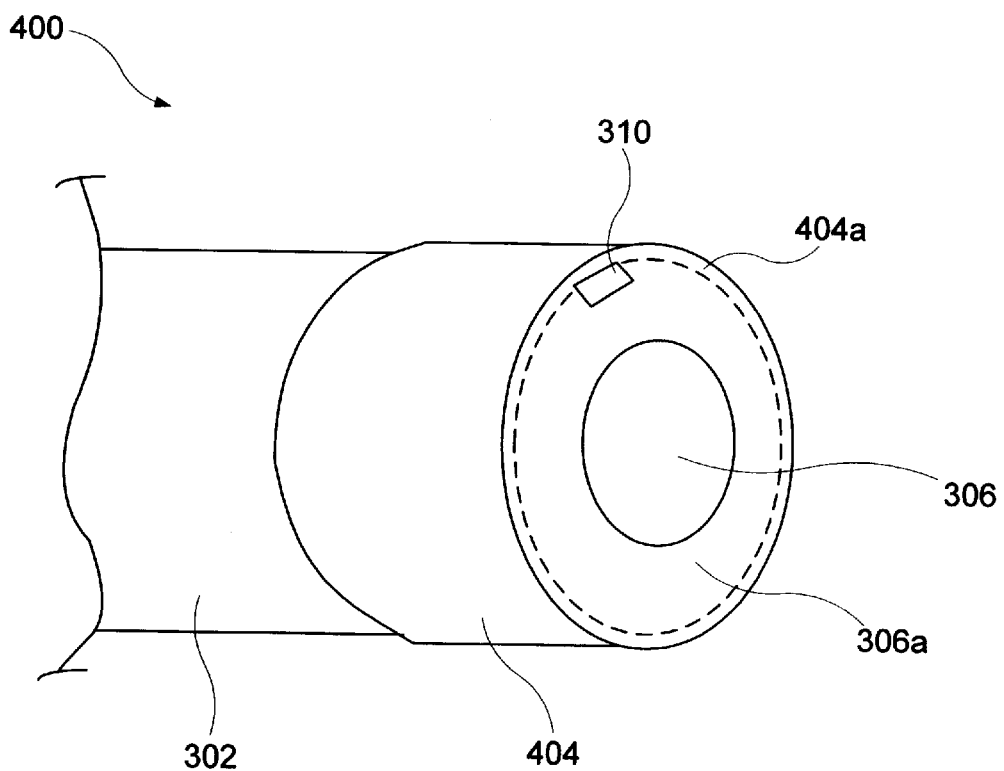
FIG. 4 illustrates a perspective view of an optical waveguide identification system according to another exemplary embodiment of the present invention.

Referring to FIGS. 3 and 4, two optical waveguide identification systems according to exemplary embodiments of the present invention will be described. The systems illustrated in those figures comprise a mask and a filter on an end face of the optical component. The mask and filter discussed with reference to FIGS. 3 and 4 are fully described in co-pending U.S. application Ser. No. 09/318,451 of Wach, et al., entitled "Optical Assembly with High Performance Filter," filed May 25, 1999, the disclosure of which is hereby fully incorporated by reference.

FIG. 3 shows an optical waveguide identification system 300, including a mask 304 and a filter 306, according to an exemplary embodiment of the present invention. System 300 comprises an optical waveguide 302. Filter 306 can be disposed on an end of waveguide 302. Polygonal mask 304 having a mask end face 304a can also be disposed on the end of waveguide 302. Mask end face 304a partially covers a circumferential edge 306a of filter 306. Identifiers 310 can be disposed within the peripheral end area of mask end face 304a and within the peripheral edge area of an exterior side of mask 304. As shown, one identifier 310 can be conveniently located in a corner of mask 304 where it can have additional space and can remain uncovered during manufacturing operations. Identifiers 310 can each be readable from the peripheral end area, the peripheral edge area, or both.

The polygonal shape of mask 304 can provide mechanical aligning assistance when joining two optical components. For example, the polygonal shape of mask 304 can provide support for a mating fiber joint assembly. Additionally, the polygonal shape of mask 304 can provide a surface for tools to grasp mask 304. Mask 304 is not limited to the hexagonal shape illustrated. Other shapes that do not degrade the performance of the optical waveguide 302 are not beyond the scope of the present invention. For example, the number of sides of polygonal mask 302 can be chosen for the particular application. For instance, the number of sides of mask 304 can change as the size of a fiber bundle is increased or decreased.

FIG. 4 shows an optical waveguide identification system 400, including a mask 404 and filter 306, according to another exemplary embodiment of the present invention. System 400 comprises optical waveguide 302. Filter 306 can be disposed on an end of waveguide 302. Mask 404 having a mask end face 404a can also be disposed on the end of fiber 302. Mask end face 404a partially covers circumferential edge 306a of filter 306. Identifier 310 can be disposed within the peripheral end area of mask end face 304a. Additionally, an identifier (not shown) may be disposed within the peripheral edge area of the exterior side of mask 304. Identifier 310 can be readable from the peripheral end area, the peripheral edge area, or both.

In systems 300 and 400, filter 306 operates to filter light that is propagating within waveguide 302 to eliminate or redirect light of certain wavelengths or to pass only light of certain wavelengths. Masks 304 and 404 are opaque to at least some wavelengths of light. Accordingly, light of the opacity wavelengths does not penetrate the mask, thereby eliminating unwanted optical noise that would result from such light penetration of the mask covered areas. Masks 304 and 404 are an integral part of systems 300 and 400, i.e., they are typically not a temporary mask for manufacturing purposes only. In other words, in the exemplary embodiment illustrated in FIGS. 3 and 4, the masks 304 and 404 are permanently affixed to their optical waveguide 302.

Identifiers 310 can be formed, and can comprise information, similar to the identifiers discussed above with reference to FIGS. 1 and 2. Additionally, the identifiers may comprise information about the mask or the filter. For example, the mask dimensions and characteristics could be identified. Furthermore, the waveguide's core and polarization axes can be identified with respect to the location of the identifier and the mask aperture location, configuration, and dimensions. Proper information in identifiers 310 can further minimize the testing burden described above. Similar to the waveguides described above, using code in identifiers 310 to reference specific, detailed computer link information can allow for unlimited information about the optical component.

Additional or fewer identifiers 310 may be provided, and identifiers 310 may be provided at locations on masks 304 and 404 other than those shown. In an exemplary embodiment, identifiers 310 can be provided in automated manufacturing systems. For example, the identifier 310 disposed within the peripheral edge area of the exterior wall of mask 304 can provide subsequent identification after end-to-end connections with another optical component. Additionally, the identifiers 310 disposed within the peripheral end area can also perform that function if readable from the peripheral edge area.

Using photo-resist material and standard photoresist techniques are exemplary methods of forming the identifiers disposed on optical waveguides and optical masks described with reference to FIGS. 1–4 above. One such process is described in U.S. Pat. No. 5,237,630 to Hogg, et al., entitled "Fiber Optic Device with Reflector Located at Splice Joint," issued Aug. 17, 1993, the disclosure of which is hereby fully incorporated by reference. In such a process, a temporary mask is formed on surface areas of the optical waveguide. The temporary mask photoresist material is applied uniformly over the entire end of the waveguide or the mask provided on the end of the waveguide. The photoresist material is then exposed image-wise in a pattern of the identifier information. At this stage, the image is typically not a readily visible image. Rather, the polymer in the resist is crosslinked in areas where the resist will remain during the etching process. The photoresist is removed (usually by solvent wash) from the appropriate surface to reveal the image pattern of the identifier information. The identifier information is then provided on the surface by, for example, etching or electrolytic deposition. Alternatively, the identifier information may be formed by precision laser etching/engraving techniques. In the latter case, as the temporary mask is removed using a solvent wash (with a different solvent), any metallic deposition covering the temporary mask is also removed, leaving only the durable metallic identifier information in a precise identifier image pattern. The identifier information should be precise and robust. Accordingly, in one exemplary embodiment, the substrate mask or waveguide is thoroughly cleaned before applying the mask material and the identifier.

The identifier provided on the cladding or mask surface can provide precise and detailed product information. For example, the information can comprise the manufacturer, the core and cladding dimensions, compositions, indices of refraction, any other imprinting that has been included, etc. In some cases, additional details may be desired. An identifier on the optical assemblies can provide sufficient information for precise mating of the assemblies, thereby producing a quality product. One advantage of using the peripheral area of the end face of an optical waveguide is the relative space available. If necessary, the entire peripheral area can be utilized to provide the required information. Image clarity of the identifier can also be improved by using more of the peripheral area. Additionally, the probability of an identifier in the peripheral cladding area causing fiber function limitations is low. That probability can be reduced further by, for example, covering disrupted (etched/engraved) surface areas with a material that restores transparency to negatively affected wavelengths. The material for the covering can be chosen so that it does not detrimentally affect the readability of the disrupted surface areas. The specific application of the present invention will determine which identifier process, marking, and location to utilize.

Figure 5:
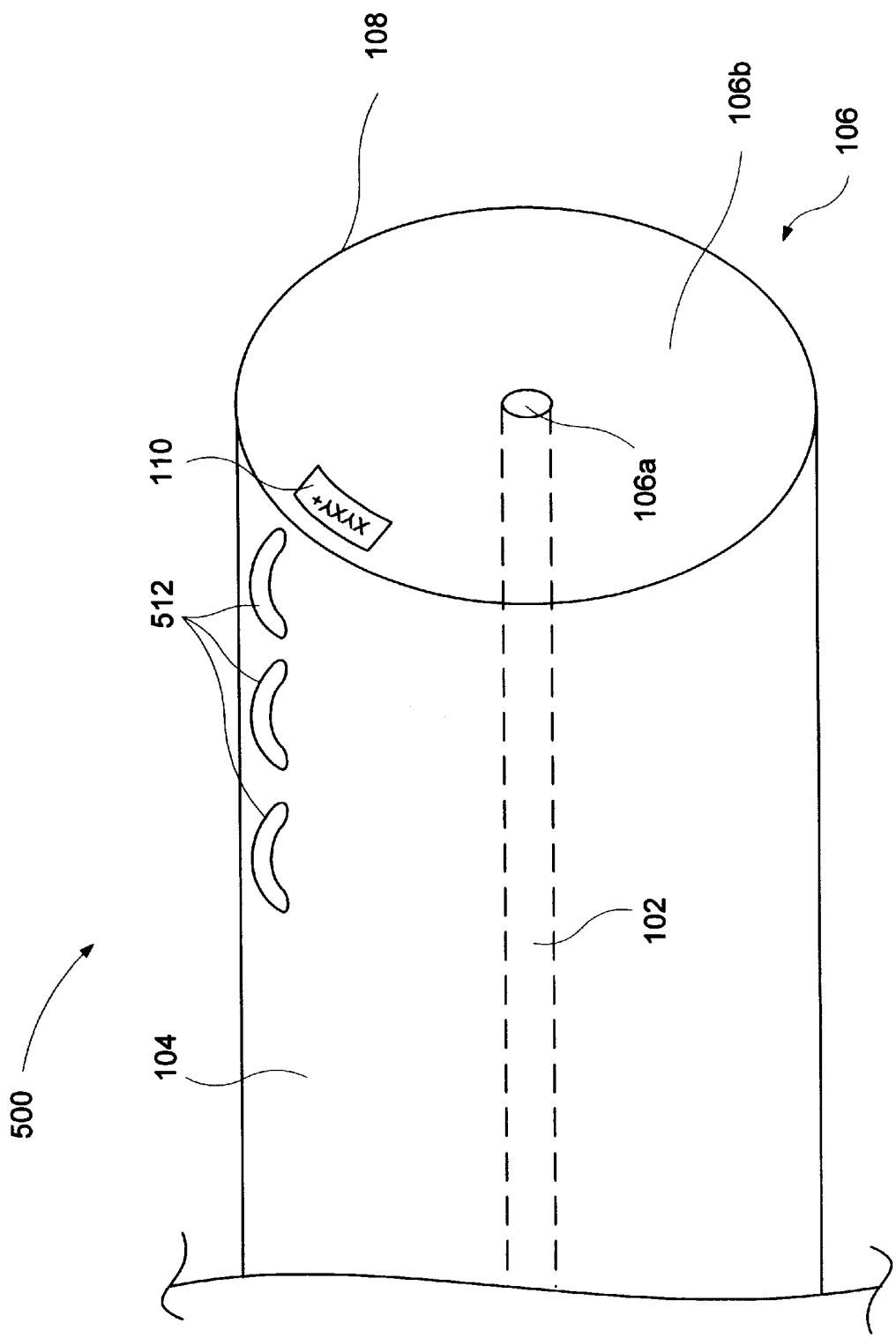
FIG. 5 illustrates a perspective view of an optical waveguide identification system according to another exemplary embodiment of the present invention.
Figure 6:
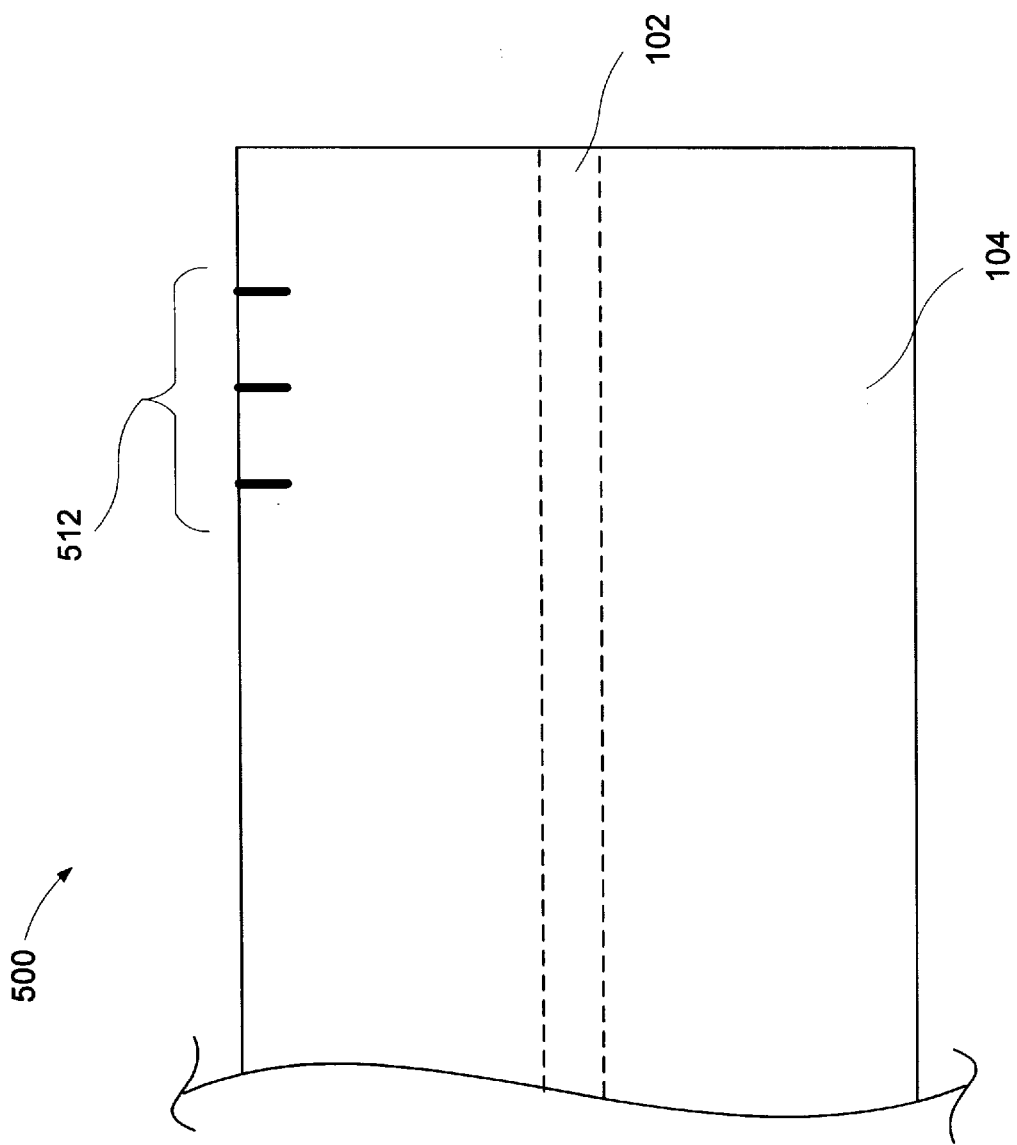
FIG. 6 illustrates a side view of the optical waveguide identification system illustrated in FIG. 5.

Referring to FIGS. 5 and 6, an optical waveguide identification system 500 according to another exemplary embodiment of the present invention will be described. FIG. 5 illustrates a perspective view of system 500. FIG. 6 illustrates a side view of system 500. System 500 comprises core 102 and cladding 104. System 500 further comprises an identifier comprising a series of precisely located disruptions 512 imprinted in cladding 104. Disruptions 512 can be positioned within the index of refraction of the cladding peripheral area. The cladding peripheral area comprises the interior of cladding 104 near the exterior (side) wall of cladding 104. Disruptions 512 may be imprinted in cladding 104 of waveguide 500 by, for example, a technique similar to those used to form fiber-Bragg gratings in optical waveguides.

A typical technique for forming fiber-Bragg gratings (i.e., the disruptions) to Ge-doped fiber core material is disclosed in U.S. Pat. No. 4,807,950 ("the '950 patent") and U.S. Pat. No. 4,725,110 ("the '110 patent"). The '950 and '110 patents of Glenn, et al., both entitled "Method for Impressing Gratings Within Fiber Optics," issued on Feb. 28, 1989, and Feb. 16, 1988, respectively. That typical technique may be modified as disclosed in U.S. Pat. No. 5,235,659 ("the '659 patent") to Atkins, et al., entitled "Method of Making an Article Comprising an Optical Waveguide," issued Aug. 10, 1993. The disclosure of each of those patents is hereby fully incorporated by reference. According to the '950 and '110 patents, Bragg reflection gratings can be formed in an optical fiber core by transverse irradiation with a particular wavelength of light in the ultraviolet absorption band of the core material. The irradiation comprises illuminating the core from the side with two coplanar, coherent beams incident at selected and complementary angles thereto with respect to the axis of the core. The grating period is selected by varying the angles of incidence of the two beams. The '659 patent modifies that process by first exposing the high-silica glass core to molecular hydrogen, which increases the refractive index of the glass in the irradiated region.

In the present invention, disruptions 512 may be formed, for example, in a manner generally consistent with the disclosure of the '950 and '110 patents. Additionally, that process disclosed in those patents may be modified as discussed in the '659 patent. However, instead of focusing the actinic radiation in core 102 of waveguide 500, the radiation is focused in cladding 104 to form disruptions 512. Actinic radiation is radiation capable of causing a chemical change. For example, the actinic radiation causes the disruptions 512 in cladding 104 by causing a physical change in the glass composition of cladding 104.

Disruptions 512 are disposed within the interior of the peripheral area of cladding 104. In one exemplary embodiment, the peripheral area is defined as a region comprising the exterior 80% of cladding 104 (similar to FIG. 1B), where 80% refers to 80% of the radius R of cladding end face 106a. In another exemplary embodiment, the peripheral area is defined as a region comprising the exterior 50% of cladding 104 (similar to FIG. 1C). In yet another exemplary embodiment, the peripheral area is defined as a region comprising the exterior 20% of cladding 104 (similar to FIG. 1D). In still another exemplary embodiment, the peripheral area is defined as a region comprising the exterior 10% of cladding 104 (similar to FIG. 1E). Locating disruptions 512 within the peripheral area of cladding 104 avoids interfering with the photon transmission purposes of waveguide 500. Disruptions 512 can be readable from the peripheral end area of cladding end face 106a, the peripheral edge area of cladding 104, or both.

Disruptions 512 can be crafted to be wavelength specific, thereby allowing a large number of individual wavelengths translated into codes to be readily readable. The sets of disruptions can be placed in different locations around the cladding peripheral area, similarly to the surface identifiers described with reference to FIGS. 1–4. Additionally, each set of disruption(s) can have, for example, a different wavelength selectivity. Accordingly, it is possible to standardize a given wavelength or combinations of wavelengths as codes representing different information. For example, each code can represent specific fiber runs and/or product codes.

Figure 7B:
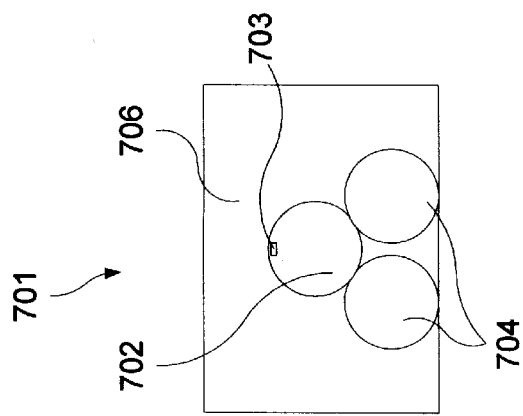
FIG. 7B illustrates a front view of a roller assembly of the system shown in FIG. 7A.
Figure 7A:
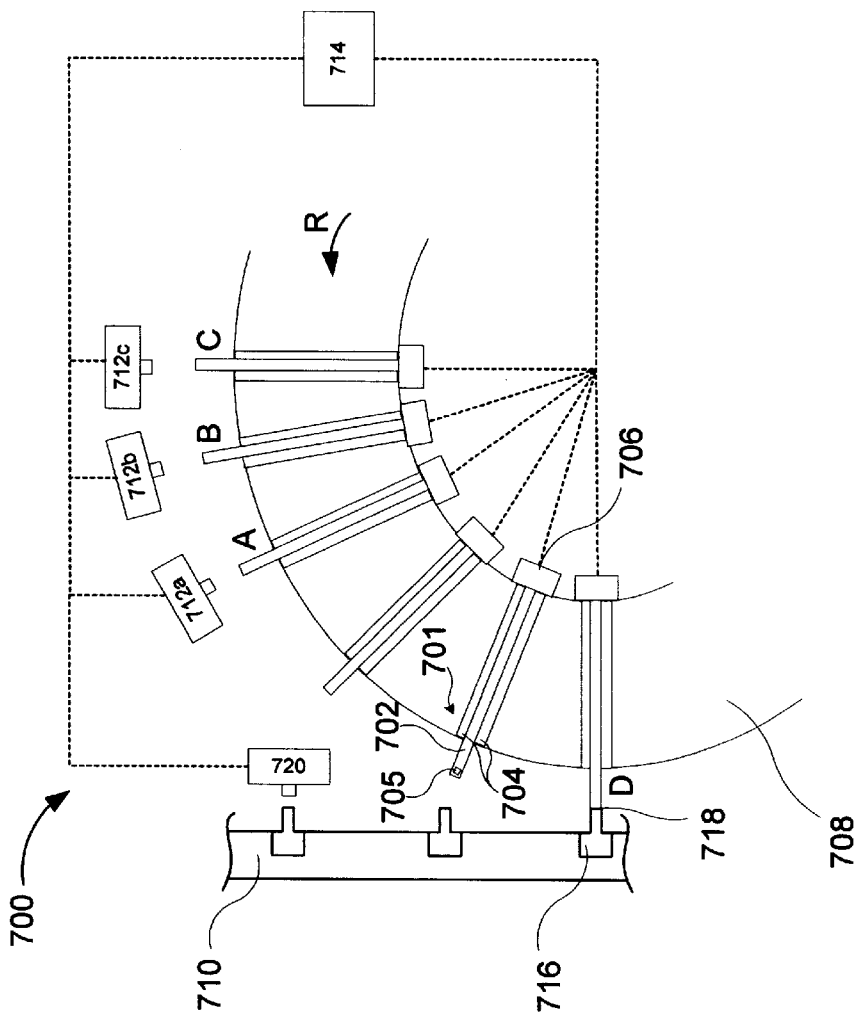
FIG. 7A illustrates a top view of an automated system for assembling optical components according to an exemplary embodiment of the present invention.

Referring now to FIGS. 7A and 7B, an exemplary embodiment of an automated system 700 for assembling optical components according to the present invention will be described. FIG. 7A shows a top view of automated system 700. FIG. 7B shows a front view of a roller assembly 701 of system 700. In system 700, a plurality of roller assemblies 701 are attached to a circular, revolving platform 708, which revolves in synchronized movement with an assembly belt 710. Each roller assembly 701 comprises a pair of precision rollers 704. At least one roller of each pair of rollers 704 is rotatably coupled to a drive motor 706. An optical waveguide 702 rests upon rollers 704. By driving one or both of rollers 704, the alignment of waveguide 702 can be effectively adjusted.

A machine-readable identifier 703 (FIG. 7B) according to the present invention can be disposed on an end face of waveguide 702. Additionally, a machine readable identifier 705 (FIG. 7A) according to the present invention can be disposed on a side of waveguide 702. First, second, and third reading devices 712a, 712b, 712c are provided to read the identifier(s) 703, 705 on each waveguide 702 when located at positions A, B, and C. Reading devices 712a, 712b, 712c may be for example, cameras, sensing devices, bar code scanners, digital scanners, etc. Information, e.g. micro bar code, read by reading devices 712a, 712b, 712c is sent to a controller 714 such as a microprocessor, for example, a bar code reader for reading micro bar codes. Controller 714 controls drive motors 706 of roller assemblies 701 located at positions A, B, and C, based on the information read by reading devices 712a, 712b, 712c, respectively. Drive motors 706 located at positions corresponding to positions A, B, and C rotate each respective roller 704 coupled thereto, thereby rotating the respective waveguide 702 for proper alignment with an optical component 716. For example, optical component 716 may be another optical waveguide, a planar light guide circuit, a waveguide for a distributed feedback laser, or other like device.

In operation, circular platform 708 revolves in direction R, thereby rotating the plurality of roller assemblies 701 through the scan region of first, second, and third reading devices 712a, 712b, 712c. As a waveguide 702 passes in the scan region of third reading device 712c at position C, information from identifier(s) 703, 705 on waveguide 702 is read by third reading device 712c and is transmitted to controller 714. Controller 714 analyzes the identifier information and compares the information with known parameters. For example, such known parameters may include the disposition of waveguide 702 about its axis. Controller 702 then activates drive motor 706 located at the position corresponding to position C to align the respective waveguide 702 by rotating roller 704 coupled thereto. As the same waveguide 702 previously scanned by third reading device 712c passes in the scan regions of second reading device 712b and then first reading device 712a at respective positions B and A, the alignment process is repeated for that waveguide 702 to more finely align waveguide 702 with optical component 716 on assembly belt 710.

At position D, waveguide 702 is coupled in precise alignment to optical component 716 at connection point 718. For example, waveguide 702 and optical component 716 may be coupled by fusing. After waveguide 702 and optical component 716 are joined, the resulting optical assembly is ready for subsequent inspection, use, distribution, etc. Additionally, after the components are joined, identifier 705 on the exterior of waveguide 702 is still visible. Accordingly, identifier 705 can be read again to determine the precise alignment of the joined components, thereby providing quality assurance/control to the assembling process.

In the exemplary embodiment described above, each drive motor 706 revolves with its respective roller assembly 701 on revolving platform 708. Each drive motor 706 can have a plurality of gearing ratios available to provide finer alignment of waveguide 702. Accordingly, when a waveguide 702 of a roller assembly 701 is at position C, the corresponding drive motor 706 then located at position C can use its larger gear to provide an initial alignment. When the waveguide 702 is at position B, a finer gear of motor 706 now located at position B can be used. Then, when the waveguide 702 is at position A, an even finer gear of motor 706 now located at position A can be used. Such use of different gearing allows fine adjustments of the alignment of waveguide 702.

In an alternative exemplary embodiment, drive motors 706 could be fixed at each position A, B, and C. Accordingly, drive motors 706 would not revolve with revolving platform 708. Only rollers 704 and waveguide 702 of roller assemblies 701 would revolve on revolving platform 708. Rollers 704 then engage and disengage the drive motors 706 located at each position A, B, and C. In this embodiment, the drive motor 706 permanently located at position B can be geared finer than the drive motor 706 permanently located at position C for more precise adjustment of the waveguide 702. Additionally, the drive motor 706 permanently located at position A can be geared even finer than the drive motor 706 permanently located at position B to assure precise alignment.

If both a waveguide 702 and an optical component 716 comprise an identifier on their respective peripheral areas or sides, the joining of the two components can be even more precise by aligning waveguide 702 based on the information of the identifiers of both components. In such an exemplary embodiment, system 700 can comprise an additional reading device 720 to read the identifier (not shown) of optical component 716. Alternatively, optical component 716 can also be adjusted for alignment with waveguide 702.

In some applications, it may be important to high volume production to read information significantly in advance of the mating operation. Additionally, it may be important for the information to be read by a different manufacturer. Accordingly, in another exemplary embodiment of the present invention, system 700 can use pre-aligned/oriented fiber segments locked into position by a belt or cartridge (not shown). The belt or cartridge can be fed at the mating location for placement of fiber segments in a predetermined alignment/orientation. This process allows operations to be maintained at a rate that is not limited by the alignment function. It also allows for efficient task separations. For example, the waveguide can be aligned significantly in advance of the coupling operation.

In another exemplary embodiment, it may be desirable for each fiber segment end to have its own identifier. With longer fiber segments it may be advantageous to include some of the information at intervals along the segment. In this longer fiber segment embodiment, the interval identifier could include distinguishing characteristic(s) to avoid confusion with end face identifiers.

The choice of location and type of identifier usually depends on the specific application. In some cases, it may be desirable to have identical identifier markings in more than one location. For example, in assemblies in which optical components will be coupled face-to-face, it may be desirable to include the identifiers on both the end face peripheral area and the side wall peripheral area near the end. The side wall peripheral area markings can be readable even after the components are coupled face-to-face. Such a construction is beneficial for both repair and quality assurance.

Figure 8:
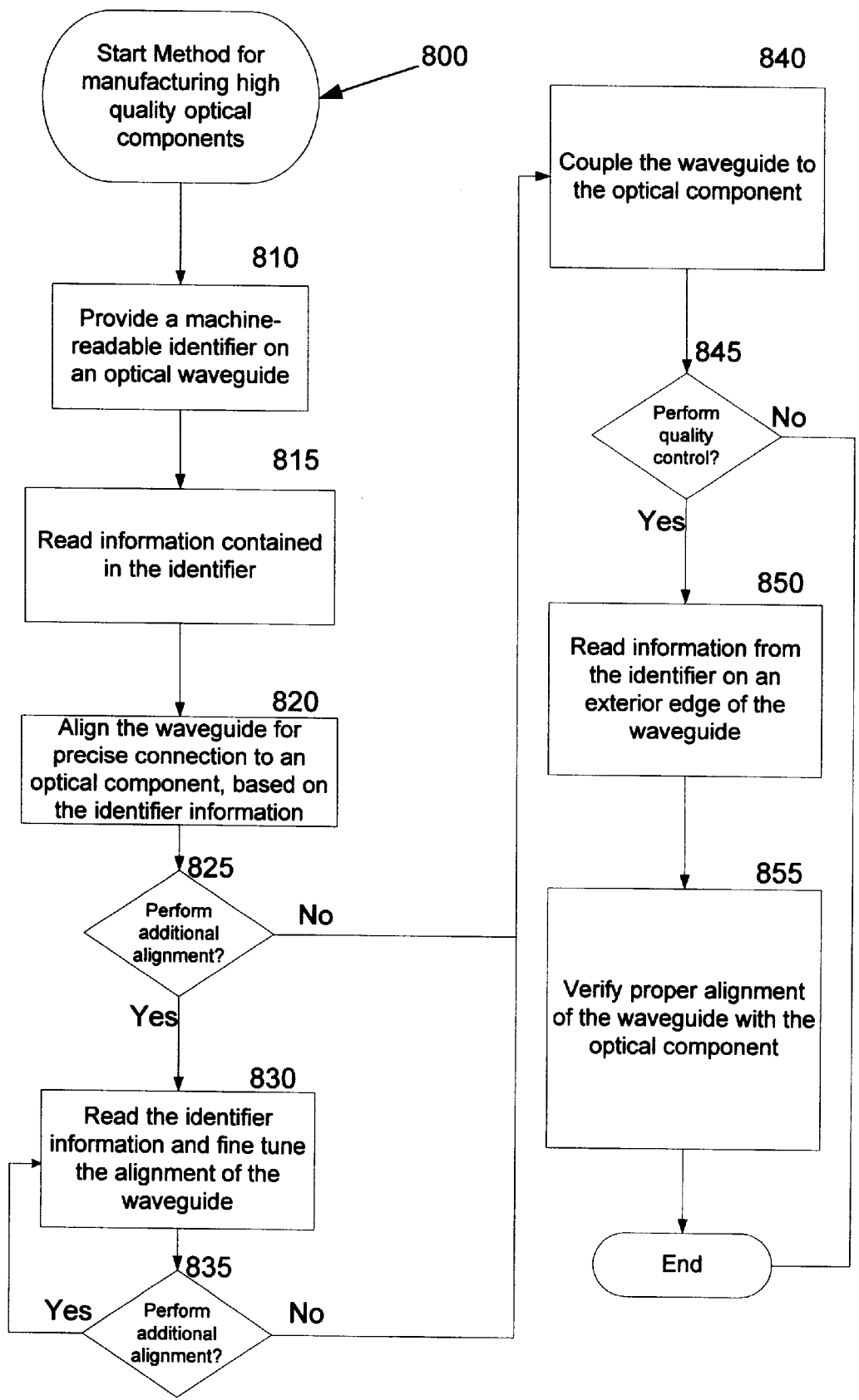
FIG. 8 is a flow chart illustrating a method for assembling optical components according to an exemplary embodiment of the present invention.

Referring now to FIG. 8, an exemplary method 800 for manufacturing quality optical assemblies according to the present invention will be described. Certain steps in the processes described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

In step 810, a machine-readable identifier is provided on an optical waveguide. Then in step 815, information contained in the identifier is read by a reading device. In step 820, the waveguide is aligned for precise connection to an optical component, based on the read information. A determination is made in step 825 whether additional alignment of the waveguide will be performed. If not, then the method proceeds to step 840, where the waveguide and the optical component are precisely coupled together. If it is determined in step 825 that additional alignment will be performed, then the method proceeds to step 830. In step 830, the identifier information is read again, and the alignment of the waveguide is fine tuned based on the read information. As shown in step 835, step 830 can be repeated as necessary until the precise alignment desired is achieved. When it is determined that step 830 will not be repeated, then the method proceeds to step 840 where the waveguide and the optical component are precisely coupled together. Step 840 could be the end of method 800. Accordingly, if it is determined in step 845 that quality control will not be performed, then the method is complete. However, if it is determined in step 845 that quality control will be performed, then the method proceeds to step 850. In step 850, the information in the identifier on the waveguide can be read again. The read information can then be used in step 855 for quality control/assurance to verify proper alignment of the waveguide and the optical component.

Although specific embodiments of the present invention have been described above in detail, it will be understood that this description is merely for purposes of illustration. Various modifications of, and equivalent steps corresponding to, the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

What is claimed is:

1. An optical waveguide identification system, comprising:
   an optical waveguide, comprising
      a core having an end portion,
      a cladding disposed around said core, said cladding having an end portion, and
      an end face comprising the end portions of said core and said cladding, said end face having a peripheral end area; and
   a machine-readable identifier disposed within the peripheral end area of said end face, said machine-readable identifier comprising information about said optical waveguide.

2. A system according to claim 1, wherein said machine-readable identifier is etched into said end face.

3. A system according to claim 1, wherein the information of said machine-readable identifier comprises one of an assembly orientation of said optical waveguide, manufacturing information for said optical waveguide, a dimension of said core, a dimension of said cladding, a composition of said core, a composition of said cladding, and indices of refraction of said optical waveguide.

4. A system according to claim 1, wherein the peripheral end area of said end face comprises an exterior 80% of the end portion of said cladding.

5. A system according to claim 4, wherein the peripheral end area of said end face comprises an exterior 50% of the end portion of said cladding.

6. A system according to claim 5, wherein the peripheral end area of said end face comprises an exterior 20% of the end portion of said cladding.

7. A system according to claim 6, wherein the peripheral end area of said end face comprises an exterior 10% of the end portion of said cladding.

8. An optical waveguide identification system, comprising:
   an optical waveguide, comprising
      a core having an end portion,
      a cladding disposed around said core, said cladding having an end portion and a peripheral edge area, and
      an end face comprising the end portions of said core and said cladding, said end face having a peripheral end area; and
   a first machine-readable identifier disposed within the peripheral end area of said end face, said first machine-readable identifier comprising information about said optical waveguide; and
   a second machine-readable identifier disposed within the peripheral edge area of said cladding, said second machine-readable identifier comprising information about said optical waveguide.

9. A system according to claim 7, wherein said first and second machine-readable identifiers comprise substantially identical information.

10. A system according to claim 7, wherein said second machine-readable identifier comprises a series of disruptions disposed in said cladding.

11. A system according to claim 7, wherein the information of said first and second machine-readable identifiers comprises one of an assembly orientation of said optical waveguide, manufacturing information for said optical waveguide, a dimension of said core, a dimension of said cladding, a composition of said core, a composition of said cladding, and indices of refraction of said optical waveguide.

12. An optical waveguide identification system, comprising:
   an optical waveguide, comprising
      a core, and
      a cladding disposed around said core, said cladding having a peripheral edge area; and
   a machine-readable identifier disposed within the peripheral edge area of said cladding, said machine-readable identifier comprising information about said optical waveguide.

13. A system according to claim 12, wherein said machine-readable identifier comprises a series of disruptions disposed in said cladding.

14. A system according to claim 12, wherein said machine-readable identifier is etched into said cladding.

15. An optical waveguide identification system, comprising:
   an optical waveguide, comprising
      a core having an end portion,
      a cladding disposed around said core, said cladding having an end portion,
      an end face comprising the end portions of said core and said cladding, and
      an optical mask disposed on said end face, said mask having a peripheral end area and a peripheral edge area; and
   a machine-readable identifier disposed within the peripheral end area of said mask, said machine-readable identifier comprising information about said optical waveguide.

16. A system according to claim 15, wherein said machine-readable identifier comprises a plurality of machine-readable identifiers disposed within the peripheral end area of said mask, each of said plurality of machine-readable identifiers comprising information about said optical waveguide.

17. A system according to claim 15, further comprising an optical filter disposed between said end face and said mask.

18. A system according to claim 15, wherein the information of said machine-readable identifier comprises one of an assembly orientation of said optical waveguide, manufacturing information for said optical waveguide, a dimension of said core, a dimension of said cladding, a composition of said core, a composition of said cladding, and indices of refraction of said optical waveguide.

19. A system according to claim 15, wherein said machine-readable identifier is etched into said mask.

20. A system according to claim 15, further comprising a second machine-readable identifier disposed within the peripheral edge area of said mask, said second machine-readable identifier comprising information about said optical waveguide.

21. A system according to claim 20, wherein said first and second machine-readable identifiers comprise substantially identical information.

22. An optical waveguide identification system, comprising:
   an optical waveguide, comprising
      a core having an end portion,
      a cladding disposed around said core, said cladding having an end portion,
      an end face comprising the end portions of said core and said cladding, and
      an optical mask disposed on said end face, said mask having a peripheral edge area; and
   a machine-readable identifier disposed within the peripheral edge area of said mask, said machine-readable identifier comprising information about said optical waveguide.

23. A system for aligning optical components, comprising:
- a first reading device that reads information from an identifier on an optical waveguide;
- an alignment device that aligns the optical waveguide with respect to an optical component; and
- a controller that controls said alignment device, based on the information read by said first reading device.

24. A system according to claim 23, further comprising:
- a second reading device that reads information from the identifier on the optical waveguide;
- wherein said controller further controls said alignment device, based on the information read by said second reading device to fine tune the alignment of the optical waveguide with respect to the optical component.

25. A system according to claim 24, wherein said alignment device comprises:
- a pair of rollers, said pair of rollers supporting the optical waveguide; and
- a drive motor, said drive motor engaging one roller of said pair of rollers to rotate said one roller,
- wherein said controller controls said drive motor to rotate said one roller to align the optical waveguide, based on the information read by said first and second reading devices.

26. A system for aligning optical components, comprising:
- a reading device that reads information from an identifier on an optical waveguide;
- an alignment device that aligns the optical waveguide with respect to an optical component, said alignment device comprising
  - a pair of rollers, said pair of rollers supporting the optical waveguide, and
  - a drive motor, said drive motor engaging one roller of said pair of rollers to rotate said one roller; and
- a controller that controls said alignment device, based on the information read by said reading device,
- wherein said controller controls said alignment device by controlling said drive motor, thereby rotating said one roller to align the optical waveguide.

27. A method for assembling quality optical components, comprising the steps of:
- providing an optical waveguide having a machine-readable identifier thereon;
- reading the information comprised in the identifier;
- aligning the optical waveguide with respect to an optical component, based on the information read in said reading step; and
- coupling the optical waveguide to the optical component.

28. A method according to claim 26, further comprising the step of fine tuning the alignment of the optical waveguide with respect to the optical component.

29. A method according to claim 28, further comprising the steps of:
- reading the information comprised in the identifier after the optical waveguide has been joined to the optical component; and
- determining if the optical waveguide is properly aligned with the optical component.

30. A fiber optic segment, comprising:
- an end face having a peripheral end area;
- a side face having a peripheral edge area; and
- a machine-readable identifier disposed on said segment and readable from one of the peripheral end area of said end face and the peripheral edge area of said side face.

31. A fiber optic segment according to claim 30, wherein said machine-readable identifier is disposed on said end face in the peripheral end area.

32. A fiber optic segment according to claim 30, wherein said machine-readable identifier is disposed in said end face in the peripheral end area.

33. A fiber optic segment according to claim 30, wherein said machine-readable identifier is disposed on said side face.

34. A fiber optic segment according to claim 30, wherein said machine-readable identifier is disposed in said side face in the peripheral edge area.

* * * * *

(12) EX PARTE REEXAMINATION CERTIFICATE (9024th)
United States Patent
Holter et al.

(10) Number: US 6,542,673 C1
(45) Certificate Issued: May 22, 2012

(54) IDENTIFIER SYSTEM AND COMPONENTS FOR OPTICAL ASSEMBLIES

(75) Inventors: Dwight J. Holter, Naples, FL (US); Michael L. Wach, Atlanta, GA (US)

(73) Assignee: Cirrex Systems LLC, Alpharetta, GA (US)

Reexamination Request:
No. 90/011,437, Jan. 14, 2011

Reexamination Certificate for:
Patent No.: 6,542,673
Issued: Apr. 1, 2003
Appl. No.: 09/888,064
Filed: Jun. 22, 2001

Related U.S. Application Data

(63) Continuation-in-part of application No. 09/318,451, filed on May 25, 1999, now Pat. No. 6,404,953, and a continuation-in-part of application No. 08/819,979, filed on Mar. 13, 1997, now Pat. No. 5,953,477.
(60) Provisional application No. 60/213,983, filed on Jun. 24, 2000.

(51) Int. Cl.
*G02B 6/42* (2006.01)

(52) U.S. Cl. ............................. 385/52; 385/31; 385/100; 385/123; 385/128

(58) Field of Classification Search ........................ None
See application file for complete search history.

(56) References Cited

To view the complete listing of prior art documents cited during the proceeding for Reexamination Control Number 90/011,437, please refer to the USPTO's public Patent Application Information Retrieval (PAIR) system under the Display References tab.

*Primary Examiner* — Deandra Hughes

(57) ABSTRACT

A device and system for eliminating repeated testing of optical components while manufacturing an optical assembly can include a high-performance optical component having a machine-readable identifier disposed within the peripheral area of its end face. The machine-readable identifier can be etched into the end face and can provide information about the component, such as any one of the following optical characteristics: orientation, manufacturing information, and dimensions and compositions of the materials of the optical component. The optical component can also have a plurality of machine-readable identifiers disposed within the peripheral area of its end face, where each can provide different information. Optical components can then be automatically and precisely aligned before being mated to form an optical assembly. A determination of the optical characteristics, information, and alignment of the components can be possible even after the components are mated together.

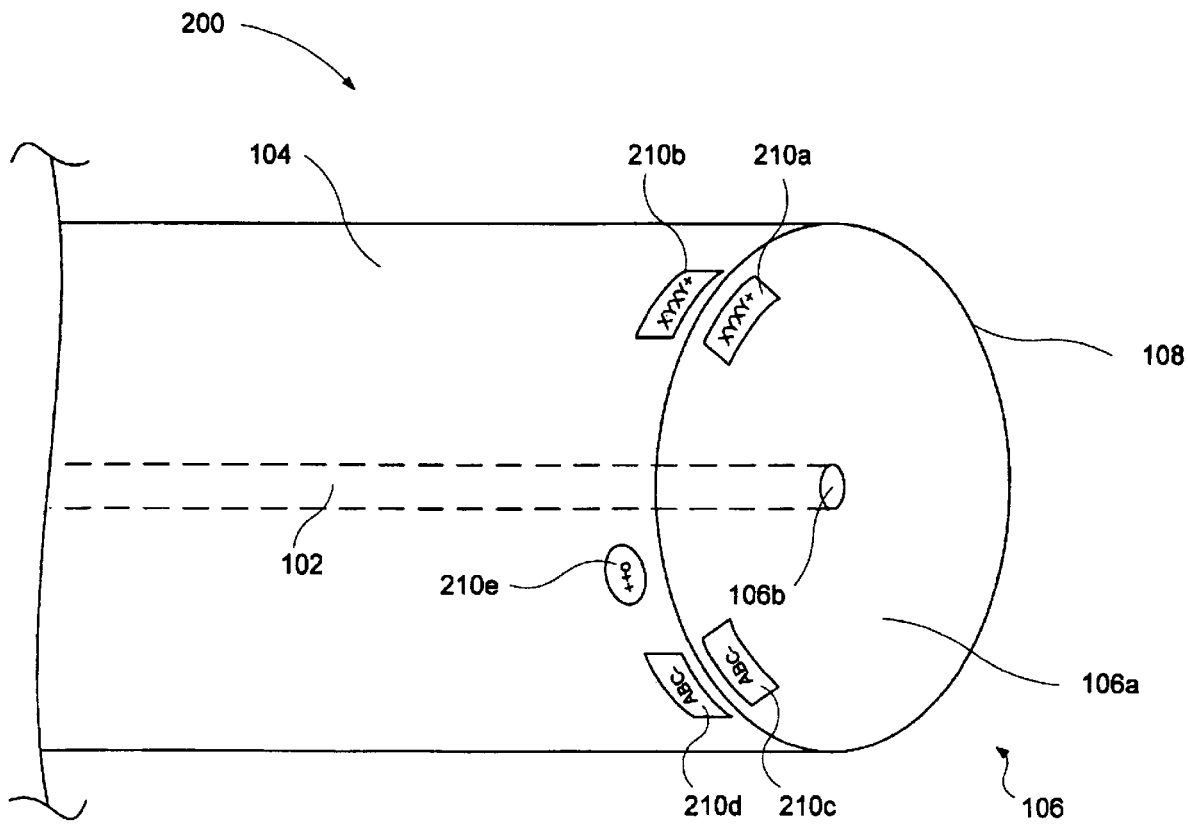

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 12-14 and 24 is confirmed.

Claim 23 is cancelled.

Claims 1-11, 15-22 and 25-34 were not reexamined.

* * * * *

(12) INTER PARTES REEXAMINATION CERTIFICATE (989th)
United States Patent
Holter et al.

(10) Number: US 6,542,673 C2
(45) Certificate Issued: Nov. 4, 2014

(54) IDENTIFIER SYSTEM AND COMPONENTS FOR OPTICAL ASSEMBLIES

(75) Inventors: Dwight J. Holter, Naples, FL (US); Michael L. Wach, Atlanta, GA (US)

(73) Assignee: Cirrex Systems LLC, Alpharetta, GA (US)

Reexamination Request:
No. 95/000,463, Apr. 27, 2009

Reexamination Certificate for:
Patent No.: 6,542,673
Issued: Apr. 1, 2003
Appl. No.: 09/888,064
Filed: Jun. 22, 2001

Reexamination Certificate C1 6,542,673 issued May 22, 2012

Related U.S. Application Data

(63) Continuation-in-part of application No. 09/318,451, filed on May 25, 1999, now Pat. No. 6,404,953, which is a continuation-in-part of application No. 08/819,979, filed on Mar. 13, 1997, now Pat. No. 5,953,477.

(60) Provisional application No. 60/213,983, filed on Jun. 24, 2000.

(51) Int. Cl.
| | | |
|---|---|---|
| G01N 21/63 | (2006.01) |
| G01N 21/65 | (2006.01) |
| G01N 21/47 | (2006.01) |
| G01N 21/77 | (2006.01) |
| G02B 6/26 | (2006.01) |
| G02B 6/04 | (2006.01) |
| G02B 6/34 | (2006.01) |
| G02B 6/24 | (2006.01) |

(52) U.S. Cl.
USPC ............. 385/52; 385/100; 385/123; 385/128; 385/31

(58) Field of Classification Search
None
See application file for complete search history.

(56) References Cited

To view the complete listing of prior art documents cited during the proceeding for Reexamination Control Number 95/000,463, please refer to the USPTO's public Patent Application Information Retrieval (PAIR) system under the Display References tab.

*Primary Examiner* — Deandra Hughes

(57) ABSTRACT

A device and system for eliminating repeated testing of optical components while manufacturing an optical assembly can include a high-performance optical component having a machine-readable identifier disposed within the peripheral area of its end face. The machine-readable identifier can be etched into the end face and can provide information about the component, such as any one of the following optical characteristics: orientation, manufacturing information, and dimensions and compositions of the materials of the optical component. The optical component can also have a plurality of machine-readable identifiers disposed within the peripheral area of its end face, where each can provide different information. Optical components can then be automatically and precisely aligned before being mated to form an optical assembly. A determination of the optical characteristics, information, and alignment of the components can be possible even after the components are mated together.

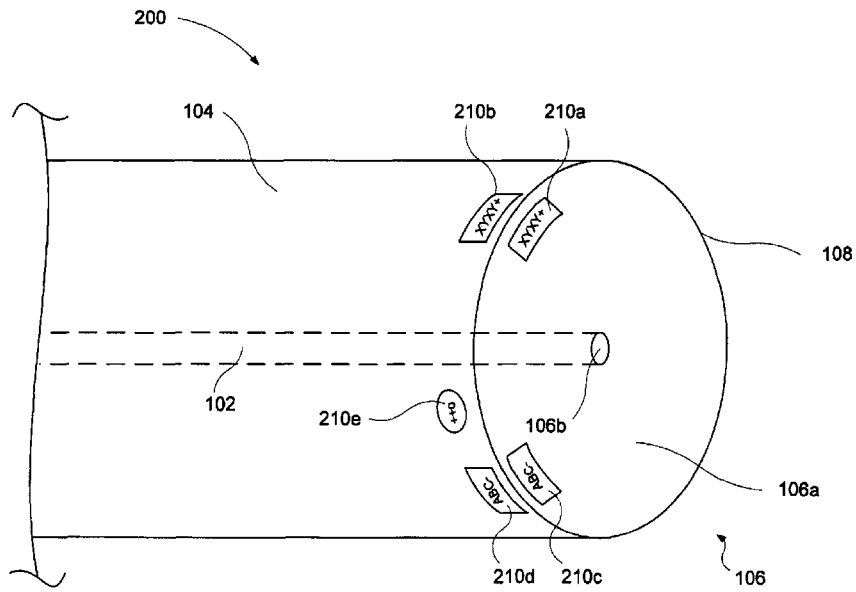

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 23 was previously cancelled.
Claims 12, 14, 24 and 27-29 are cancelled.
Claims 9-11 are determined to be patentable as amended.
New claims 35-57 are added and determined to be patentable.
Claims 1-8, 13, 15-22, 25-26 and 30-34 were not reexamined.

9. A system according to claim [7] *8*, wherein said first and second machine-readable identifiers comprise substantially identical information.

10. A system according to claim [7] *8*, wherein said second machine-readable identifier comprises a series of disruptions disposed in said cladding.

11. A system according to claim [7] *8*, wherein the information of said first and second machine-readable identifiers comprises one of an assembly orientation of said optical waveguide, manufacturing information for said optical waveguide, a dimension of said core, a dimension of said cladding, a composition of said core, a composition of said cladding, and indices of refraction of said optical waveguide.

*35. A system according to claim 1, wherein the machine-readable identifier comprises alphanumeric information.*

*36. A system according to claim 1, wherein the machine-readable identifier comprises a registration mark.*

*37. A system according to claim 1, wherein the machine-readable identifier comprises a plurality of machine-readable identifiers, each of the machine-readable identifiers comprising different information.*

*38. A system according to claim 1, wherein the machine-readable identifier comprises a metallic material.*

*39. A system according to claim 1, wherein the optical waveguide comprises a planar light guide circuit.*

*40. A system according to claim 39, wherein the machine-readable identifier comprises alphanumeric information.*

*41. A system according to claim 39, wherein the machine-readable identifier comprises a registration mark.*

*42. A system according to claim 39, wherein the machine-readable identifier comprises a plurality of machine-readable identifiers, each of the machine-readable identifiers comprising different information.*

*43. A system according to claim 8, wherein at least one of the first machine-readable identifier and the second machine-readable identifier comprises alphanumeric information.*

*44. A system according to claim 8, wherein at least one of the first machine-readable identifier and the second machine-readable identifier comprises a registration mark.*

*45. A system according to claim 8, wherein the machine-readable identifiers comprise different information.*

*46. A system according to claim 8, wherein at least one of the first machine-readable identifier and the second machine-readable identifier comprises a metallic material.*

*47. A system according to claim 8, wherein the optical waveguide comprises a planar light guide circuit.*

*48. A system according to claim 47, wherein at least one of the first machine-readable identifier and the second machine-readable identifier comprises alphanumeric information.*

*49. A system according to claim 47, wherein at least one of the first machine-readable identifier and the second machine-readable identifier comprises a registration mark.*

*50. A fiber optic segment according to claim 30, wherein the machine-readable identifier comprises a series of disruptions disposed in a cladding of the fiber optic segment, the series of disruptions being disposed outside a substantive evanescent field of propagating light of the fiber optic segment.*

*51. A fiber optic segment according to claim 50, wherein the peripheral edge area comprises an exterior portion of the cladding, and*
  *wherein the series of disruptions is disposed on the exterior portion of the cladding.*

*52. A fiber optic segment according to claim 51, wherein the exterior portion comprises 10% of the cladding.*

*53. A fiber optic segment according to claim 51, wherein the exterior portion comprises 20% of the cladding.*

*54. A fiber optic segment according to claim 51, wherein the exterior portion comprises 50% of the cladding.*

*55. A fiber optic segment according to claim 51, wherein the exterior portion comprises 80% of the cladding.*

*56. A fiber optic segment according to claim 30, wherein the identifier comprises a metallic material.*

*57. A fiber optic segment according to claim 30, wherein the identifier comprises alphanumeric information.*

\* \* \* \* \*